United States Patent
Greenberg

(10) Patent No.: US 10,203,517 B2
(45) Date of Patent: Feb. 12, 2019

(54) FOLDING EYEGLASS FRAMES HAVING A BRIDGE ASSEMBLY

(71) Applicant: Max Engbar Greenberg, Pasadena, CA (US)

(72) Inventor: Max Engbar Greenberg, Pasadena, CA (US)

(73) Assignee: ROAV INC., Pasadena, CA (US)

( * ) Notice: Subject to any disclaimer, the term of this patent is extended or adjusted under 35 U.S.C. 154(b) by 0 days.

(21) Appl. No.: 15/649,141

(22) Filed: Jul. 13, 2017

(65) Prior Publication Data

US 2018/0017808 A1    Jan. 18, 2018

Related U.S. Application Data

(60) Provisional application No. 62/362,263, filed on Jul. 14, 2016.

(51) Int. Cl.
   *G02C 5/08*        (2006.01)
   *G02C 5/00*        (2006.01)

(52) U.S. Cl.
   CPC .............. *G02C 5/006* (2013.01); *G02C 5/08* (2013.01); *G02C 2200/12* (2013.01); *G02C 2200/22* (2013.01)

(58) Field of Classification Search
   CPC ...... G02C 5/08; G02C 5/006; G02C 2200/06; G02C 2200/22; G02C 5/22
   USPC ........................................ 351/63, 124; 2/454
   See application file for complete search history.

(56) References Cited

U.S. PATENT DOCUMENTS

| 2,419,303 | A | 4/1947 | George |
| 5,532,766 | A | 7/1996 | Mateer et al. |
| 6,409,335 | B1 * | 6/2002 | Lipawsky ................ G02C 5/06 351/124 |
| 7,344,242 | B2 | 3/2008 | Habermann |
| 7,604,347 | B2 | 10/2009 | Gottschling et al. |
| D702,282 | S | 4/2014 | Szymanski |
| D719,606 | S | 12/2014 | Behling |

(Continued)

FOREIGN PATENT DOCUMENTS

| CN | 205353476 U | 6/2016 |
| WO | 2014173872 A1 | 10/2014 |

OTHER PUBLICATIONS

"Faux Tortoise Shell Folding Glasses", PHISICk, Medical Antiques, 2017.

(Continued)

*Primary Examiner* — Hung Dang
(74) *Attorney, Agent, or Firm* — Benesch, Friedlander, Coplan & Aronoff LLP

(57) ABSTRACT

An eyeglass structure includes a bridge, a first frame portion, and a second frame portion. The bridge includes a first lateral bridge column and a second lateral bridge. The first frame portion includes a first leaf spring having a distal portion configured to reach around and rotate about the first lateral bridge column. A first tab configured to engage the bridge to limit rotation of the first frame portion is further included in the first frame portion. Likewise, the second frame portion includes a second leaf spring having a distal portion configured to reach around and rotate about the second lateral bridge column, and a second tab configured to engage the bridge to limit rotation of the second frame portion.

20 Claims, 5 Drawing Sheets

(56) References Cited

U.S. PATENT DOCUMENTS 9,122,076 B2    9/2015  Castillo
2016/0033789 A1    2/2016  Klant

OTHER PUBLICATIONS

"Foldable Moscot mod. Lemtosh", Gentlementools, Jun. 29, 2015.
English translation of claims and description of CN205353476U.

* cited by examiner

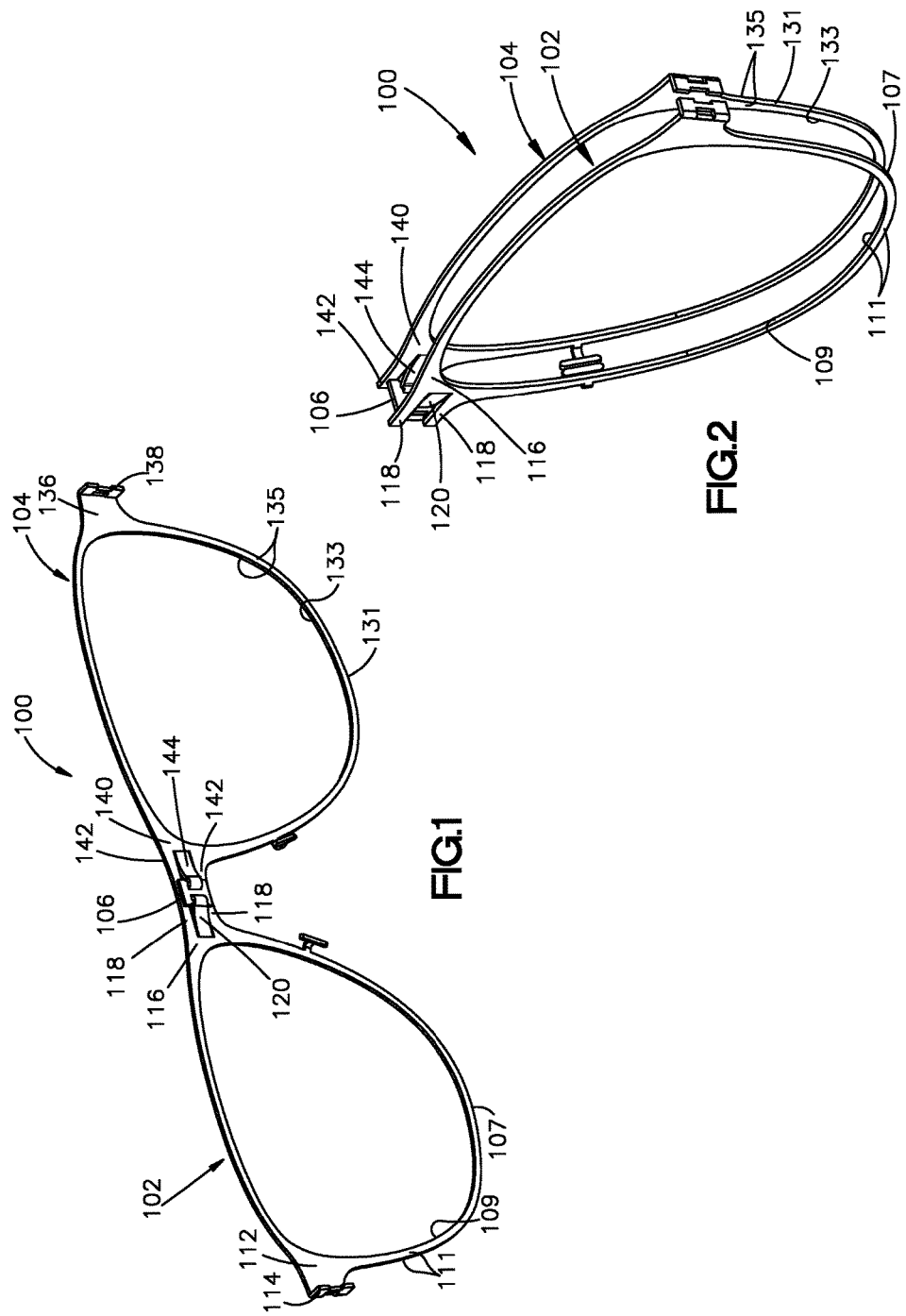

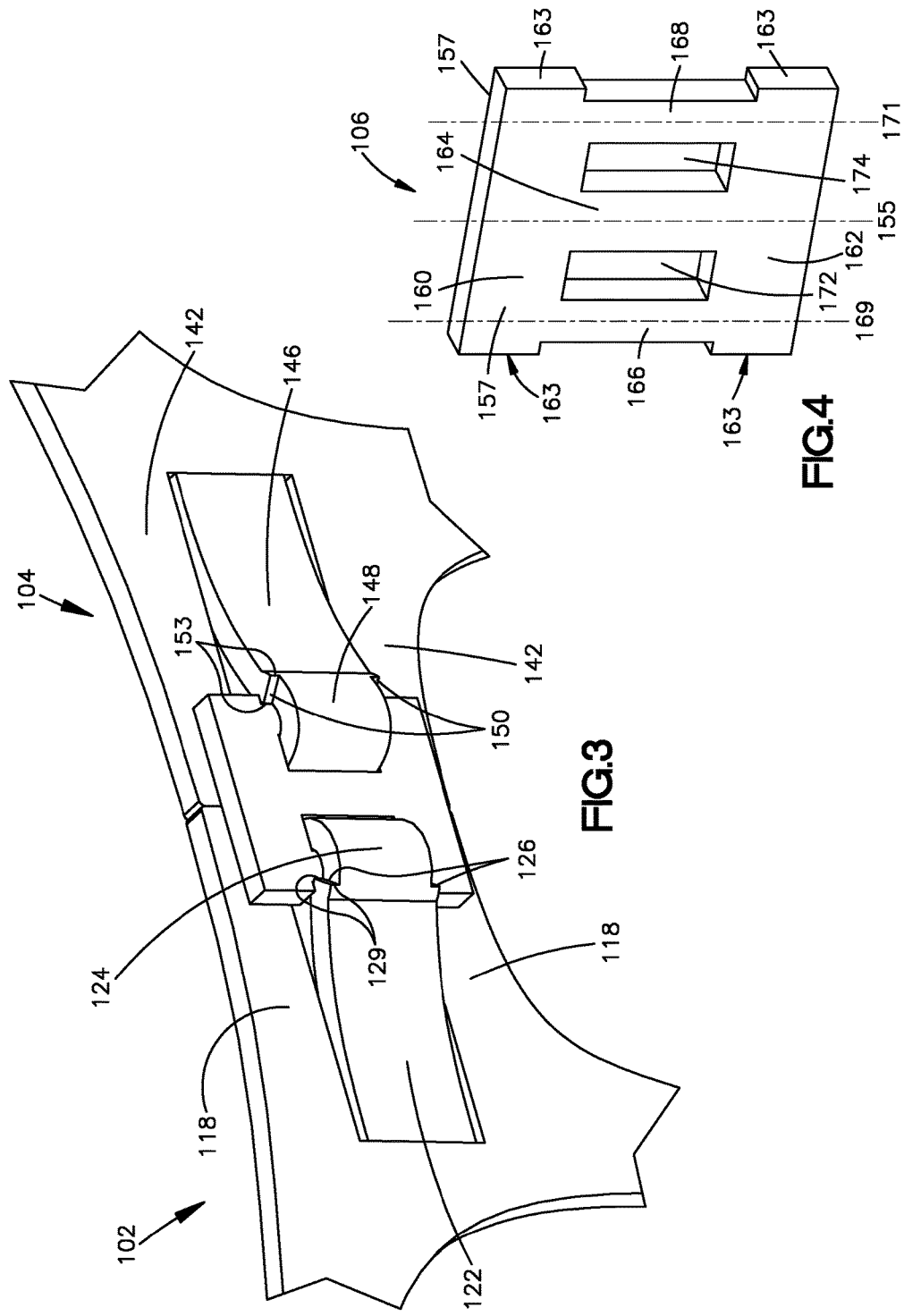

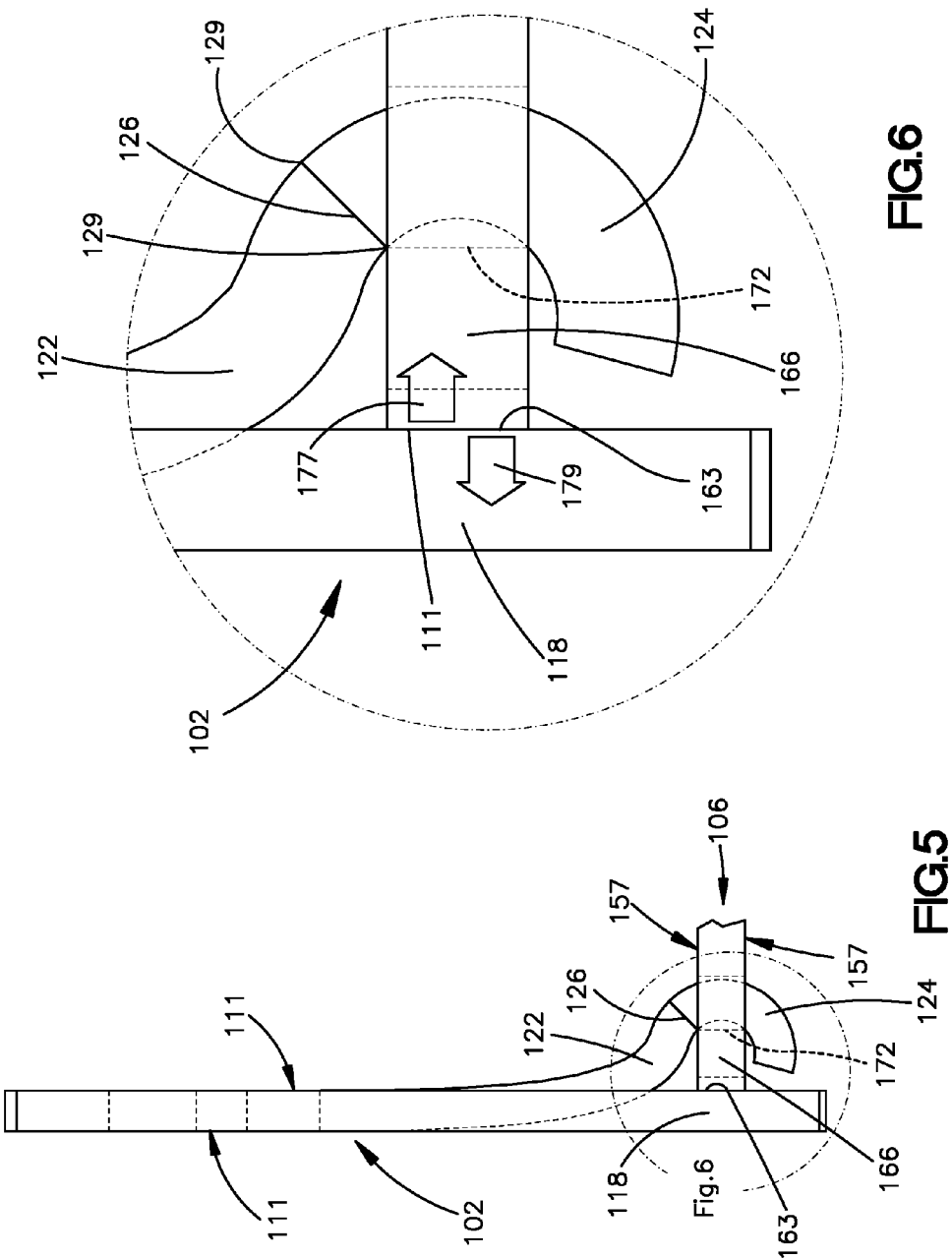

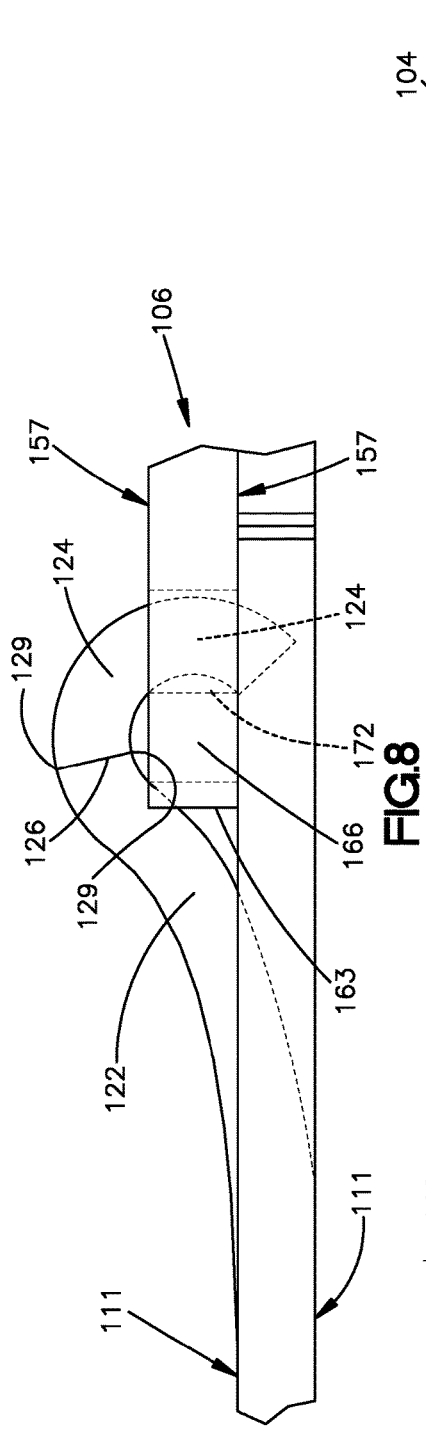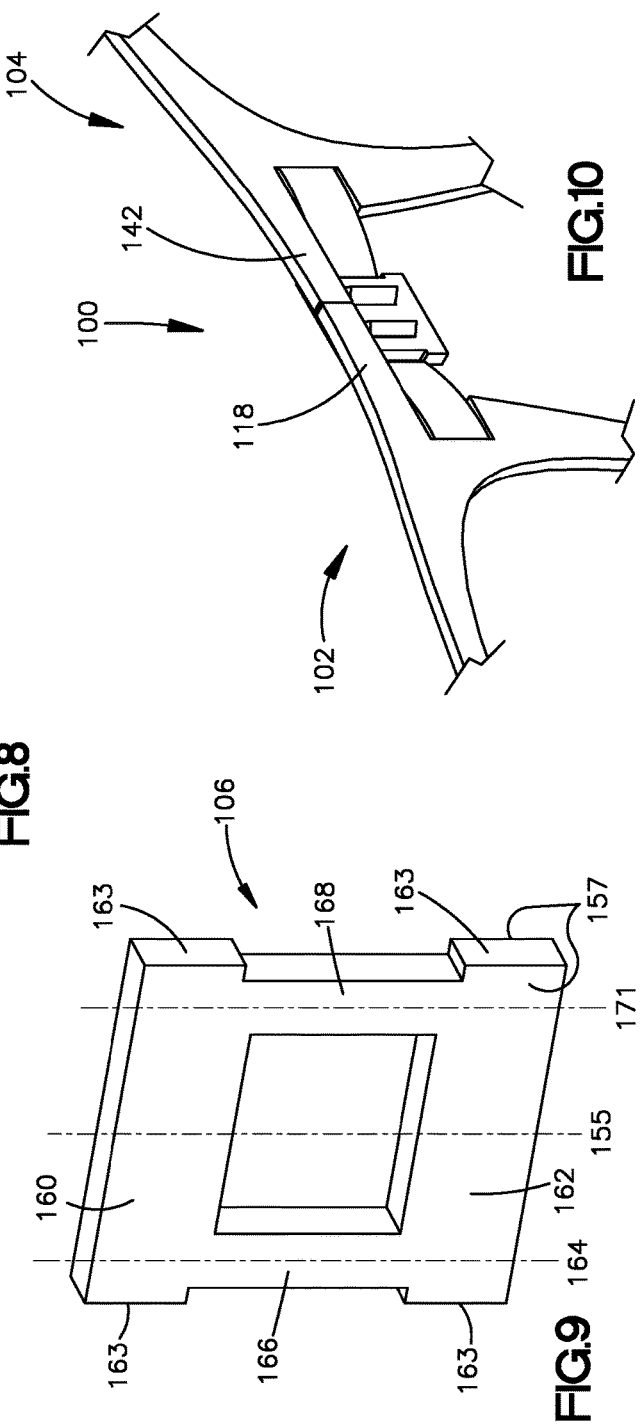

FOLDING EYEGLASS FRAMES HAVING A BRIDGE ASSEMBLY

CROSS REFERENCED TO RELATED APPLICATION

This application claims the benefit of U.S. Provisional Application No. 62/362,263 filed on Jul. 14, 2016, entitled "SCREWLESS EYEGLASS FRAME BRIDGE ASSEMBLY WITH SPRING ACTION", the content of which is incorporated herein in its entirety.

TECHNICAL FIELD

This technology relates to folding eyeglass frames having a bridge assembly.

BACKGROUND

Certain folding eyeglass frames include a hinge at the bridge. The hinge enables the left and right frame portions to fold together to minimize the space the frames occupy. Such conventional folding eyeglass frames use pins or screws in the hinge, which are prone to loosening over time, and thereby causing the left and right frame portions to fold or unfold unintentionally. Thus, a user is required to routinely tighten the pins or screws to prevent unintended movement of the frames.

SUMMARY

An eyeglass structure includes a bridge, a first frame portion, and a second frame portion. A first lateral bridge column and a second lateral bridge column are included in the bridge. The first frame portion includes a first leaf spring having a distal portion configured to reach around and rotate about the first lateral bridge column. The first frame portion further includes a first tab configured to engage the bridge to limit rotation of the first frame portion. Likewise, the second frame portion includes a second leaf spring having a distal portion configured to reach around and rotate about the second lateral bridge column, and a second tab configured to engage the bridge to limit rotation of the second frame portion.

Summarized differently, an eyeglass structure includes a bridge, a first frame portion, and a second frame portion. The bridge includes an upper horizontal member and a lower horizontal member. The bridge further includes a first aperture defining a first lateral bridge column that interconnects the upper horizontal member and the lower horizontal member. Furthermore, the bridge includes a second aperture defining a second lateral bridge column that interconnects the upper horizontal member and the lower horizontal member. The first frame portion includes a first leaf spring having a distal portion configured to reach around and rotate about the first lateral bridge column. A first tab configured to engage the bridge to limit rotation of the first frame portion is further included in the first frame portion. Similarly, the second frame portion includes a second leaf spring having a distal portion configured to reach around and rotate about the second lateral bridge column, and a second tab configured to engage the bridge to limit rotation of the second frame portion.

Summarized another way, an eyeglass structure includes a bridge, a first frame portion, and a second frame portion. The bridge includes an upper horizontal member and a lower horizontal member. An aperture defining a first lateral bridge column and a second lateral bridge column is further included in the bridge. The first lateral bridge column and the second lateral bridge column interconnect the upper horizontal member and the lower horizontal member. The first frame portion includes a first leaf spring having a distal portion configured to reach around and rotate about the first lateral bridge column. Furthermore, the first frame portion includes a first tab configured to engage the bridge to limit rotation of the first frame portion. Likewise, the second frame portion includes a second leaf spring having a distal portion configured to reach around and rotate about the second lateral bridge column, and a second tab configured to engage the bridge to limit rotation of the second frame portion.

BRIEF DESCRIPTION OF THE DRAWINGS

FIG. 1 is a perspective view of an eyeglass structure.
FIG. 2 is a perspective view of an eyeglass structure.
FIG. 3 is an enlarged view of a portion of the eyeglass structure as shown in FIGS. 1 and 2.
FIG. 4 is an enlarged view of a bridge of an eyeglass structure.
FIG. 5 is a top view of an eyeglass structure.
FIG. 6 is an enlarged view of a portion of the eyeglass structure as shown in FIG. 5.
FIG. 8 is an enlarged top view of an eyeglass structure.
FIG. 9 illustrates another embodiment of a bridge of the eyeglass structure as shown in FIGS. 1 and 2.
FIG. 10 illustrates another embodiment of frame portions of the eyeglass structure as shown in FIGS. 1 and 2.

DETAILED DESCRIPTION

Figure 7:
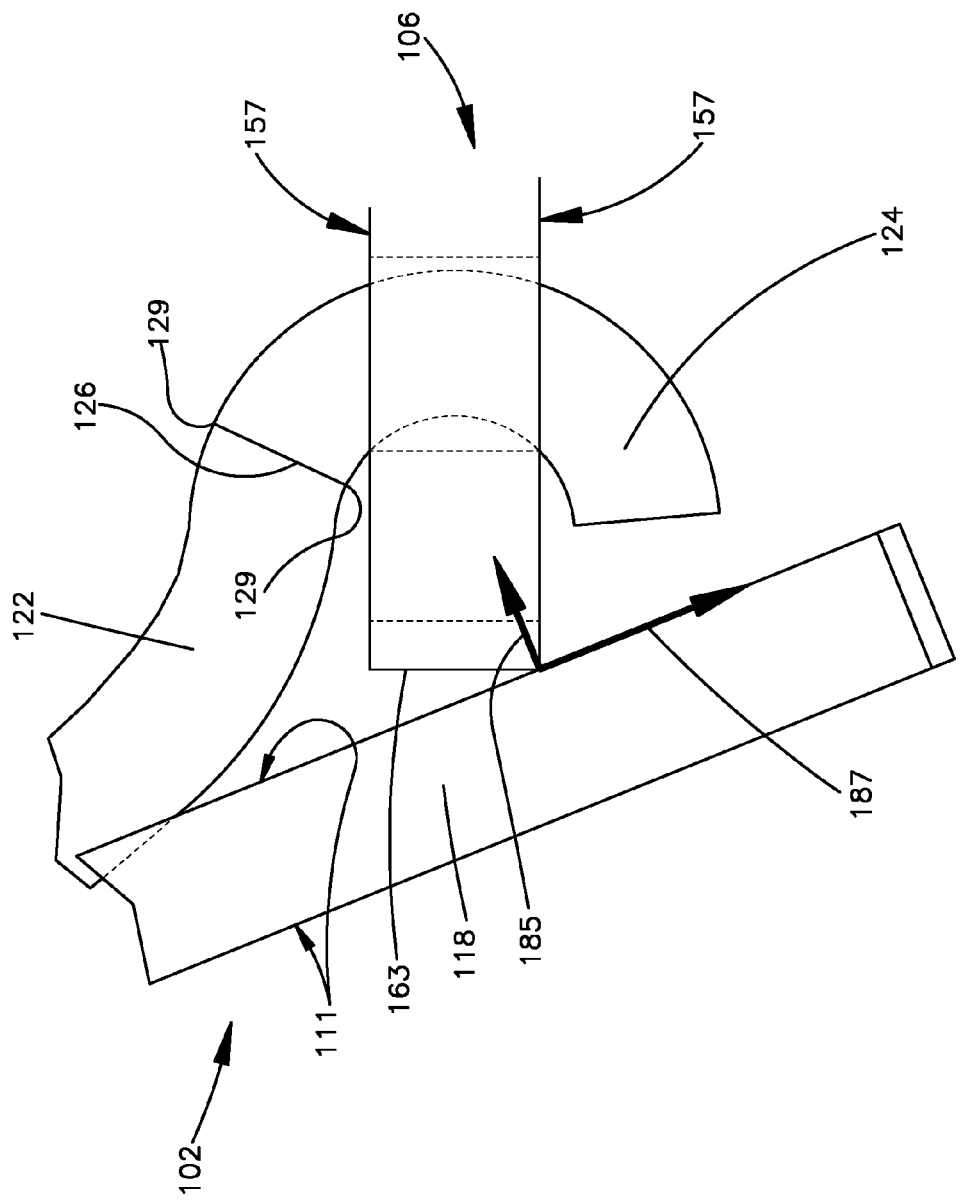
FIG. 7 is an enlarged top view of an eyeglass structure.

The structures illustrated in the drawings include examples of the elements recited in the claims. The illustrated structures thus include examples of how a person of ordinary skill in the art can make and use the claimed invention. These examples are described to meet the enablement and best mode requirements of the patent statue without imposing limitations that are not recited in the claims. One or more of the elements of one embodiment may be used in combination with, or as a substitute for, one or more elements of another as needed for any particular implementation of the invention.

FIGS. 1 and 2 illustrate an assembled condition of an eyeglass structure 100. The eyeglass structure 100 has a first frame portion 102 configured oppositely to a second frame portion 104. The eyeglass structure 100 further includes a bridge 106 that interconnects the first frame portion 102 and the second frame portion 104. The first frame portion 102 and the second frame portion 104 engage the bridge 106. This engagement allows the first frame portion 102 and the second frame portion 104 to rotate relative to the bridge 106. For example, the first frame portion 102 and the second frame portion 104 are each configured to independently rotate to and from a fully unfolded position, as shown in FIG. 1. In another example, the first frame portion 102 and second frame portion 104 are each configured to independently rotate to and from a fully folded position, as shown in FIG. 2.

The first frame portion 102 is preferably constructed as a unitary piece (e.g., one part throughout) and formed uniformly of the same material. The first frame portion 102 includes an outer peripheral surface 107 defining a shape of the first frame portion 102, and an inner peripheral surface 109 for enclosing a lens of the first frame portion 102. The first frame portion 102 further includes opposite front and rear surfaces 111. Additionally, the first frame portion 102 includes an outwardly extending peripheral portion 112 from which projects an endpiece 114. The endpiece 114 is configured to engage a temple portion via a hinge assembly, allowing the temple portion to pivot toward or away from the first frame portion 102.

As shown in FIGS. 1 and 2, and in enlarged detail in FIG. 3, the first frame portion 102 further includes an inwardly extending peripheral portion 116 from which projects two first tabs 118. The two first tabs 118 have a generally rectangular periphery. A first leaf spring 120 likewise projects from the inwardly extending peripheral portion 116 of the first frame portion 102 and is arranged between the two first tabs 118.

Referring to FIG. 3, the first leaf spring 120 includes a body portion 122 and a distal portion 124. The body portion 122 extends from the outer peripheral surface 107 of the first frame portion 102. The distal portion 124 extends from the body portion 122. The body portion 122 has a generally rectangular shape, which bows inwardly. The distal portion 124 is hook-shaped having a predetermined curve along an arc length, wherein the curve is opposite to the curve of the body portion 122. A width of the distal portion 124 is less than a width of the body portion 122, creating opposed stops 126 at a junction of the body portion 122 and the distal portion 124. The opposed stops 126 are similarly arranged on either side of the distal portion 124 and have generally rectangular outwardly facing surfaces with opposite upper and lower corners 129.

Referring again to FIGS. 1 and 2, the eyeglass structure 100 further includes a second frame portion 104. The second frame portion 104 is substantially similar and configured oppositely to the first frame portion 102. As a result, the second frame portion 104 is preferably constructed as a unitary piece and formed uniformly of the same material. Furthermore, the second frame portion 104 includes an outer peripheral surface 131, an inner peripheral surface 133, opposite front and rear surfaces 135, and an outwardly extending peripheral portion 136 from which projects an endpiece 138. Additionally, the second frame portion 104 includes an inwardly extending peripheral portion 140 from which projects two second tabs 142 and a second leaf spring 144. As shown in FIG. 3, the second leaf spring 144 has a body portion 146 and a distal portion 148. The body portion 146 extends from the outer peripheral surface 131 of the second frame portion 104, and the distal portion 148 extends from the body portion 146. At a junction of the body portion 146 and the distal portion 148 are two opposed stops 150. The opposed stops 150 are similarly arranged on either side of the distal portion 148 and have generally rectangular outwardly facing surfaces with opposite upper and lower side corners 153.

As shown in enlarged detail in FIG. 4, the bridge 106 has a generally rectangular periphery with a centerline 155 and opposite front and rear surfaces 157. An upper horizontal member 160 and a lower horizontal member 162 are further included in the bridge 106. The upper horizontal member 160 and the lower horizontal member 162 each have laterally opposed sides, defining side surfaces 163 of the bridge 106.

The upper horizontal member 160 and the lower horizontal member 162 are interconnected by a central bridge column 164, a first lateral bridge column 166, and a second lateral bridge column 168. The central bridge column 164 extends vertically along the centerline 155. The first lateral bridge column 166 and the second lateral bridge column 168 are substantially alike and oppositely oriented at locations spaced laterally and equally from the centerline 155. A vertical rotational axis 169 is formed along a length of the first lateral bridge column 166. Similarly, a vertical rotational axis 171 is formed along a length of the second lateral bridge column 168. The upper horizontal member 160, the lower horizontal member 162, the central bridge column 164, and the first lateral bridge column 166 together define a first aperture 172. Likewise, the upper horizontal member 160, the lower horizontal member 162, the central bridge column 164, and the second lateral bridge column 168 together define a second aperture 174.

FIGS. 1-3 illustrate the assembled condition of the eyeglass structure 100. In the assembled condition, the distal portion 124 of the first leaf spring 120 and the distal portion 148 of the second leaf spring 144 engage the respective lateral bridge columns 166 and 168. For example, the distal portion 124 of the first leaf spring 120 reaches around the rear surface 157 of the first lateral bridge column 166, and is received through the first aperture 172 to the front surface 157 of the bridge 106. In another example, the distal portion 148 of the second leaf spring 144 reaches around the rear surface 157 of the second lateral bridge column 168, and is received through the second aperture 174 to the front surface 157 of the bridge 106. In the assembled condition, the first frame portion 102 and the second frame portion 104 are each configured to rotate about the corresponding rotational axis 169 and 171 of the lateral bridge columns 166 and 168.

The first and second leaf springs 120 and 144 are placed in a stressed condition in response to an engagement of the first and second leaf springs 120 and 144 with the respective lateral bridge columns 166 and 168. In the stressed condition, for example, as shown in FIG. 3, the first leaf spring 120 is deflected rearward from the first tabs 118, and thus, deflected into the stressed condition. Similarly, the second leaf spring 144 is deflected rearward from the second tabs 142, and thus, deflected into the stressed condition. As a result, in the assembled condition, each leaf spring 120 and 144 causes the respective frame portion 102 and 104 to apply a force on the bridge 106, wherein a magnitude and a direction of the force is dependent on the position of the frame portion 102 and 104 relative to the bridge 106.

Referring to FIG. 5, in the fully folded position, the front and rear surfaces 111 of the first frame portion 102 are oriented about 90 degrees, or are substantially perpendicular, to the front and rear surfaces 157 of the bridge 106. The two first tabs 118 project downward a distance beyond the front surface 157 of the bridge 106. Furthermore, the rear surface 111 of each first tab 118 contacts the side surfaces 163 of the bridge 106. As shown in FIG. 6, the lower corners 129 of the opposed stops 126 contact the rear surfaces 157 of the upper horizontal member 160 and the lower horizontal member 162. This contact prevents rotation of the rear surface 111 of the first frame portion 102 to an angle of less than about 90 degrees relative to the front and rear surfaces 157 of the bridge 106.

In the fully folded position, the first leaf spring 120 is in the stressed condition. The first leaf spring 120 causes the rear surfaces of the first tabs 118 to apply a perpendicular force 177 to the side surfaces 163 of the bridge 106. Furthermore, the side surfaces 163 of the bridge 106 apply a reactive normal force 179, or a force perpendicular to the surface of contact, to the rear surfaces 111 of the first tabs 118. Because parallel opposed force components are involved, the first frame portion 102 remains in the fully folded position.

Referring to FIG. 7, to begin rotating the first frame portion 102 from the fully folded position to the fully unfolded position, a user may apply a force to the rear surface 111 of the first frame portion 102. As the first frame portion 102 starts to rotate, the rear surfaces 111 of the first tabs 118 and the side surfaces 163 of the bridge 106 become angled relative to each other. The angle corresponds to the angle of rotation of the first frame portion 102. Furthermore, the rear surfaces 111 of the first tabs 118 begin to pivot toward the front surfaces 157 of the upper horizontal member 160 and lower horizontal member 162 of the bridge 106. This increases the distance the first tabs 118 project beyond the front surface 157 of the bridge 106.

The user may apply the force until the front and rear surfaces 111 of the first frame portion 102 rotate about the axis 169 of the first lateral bridge column 166 to a threshold angle. In this example, the threshold angle is about 110 degrees relative to the front and rear surfaces 157 of the bridge 106. Upon rotation to the threshold angle, the user no longer needs to apply the force to the rear surface 111 of the first frame portion 102. Instead, the first leaf spring 120 compels, or snaps, the first frame portion 102 to the fully unfolded position.

For instance, as shown in detail in FIG. 7, when the front and rear surfaces 157 of the first frame portion 102 are rotated to the threshold angle, the rear surfaces 157 of the first tabs 118 contact front corners of the side surfaces 163 of the bridge 106. Furthermore, as the front and rear surfaces 157 of the first frame portion 102 approach the threshold angle, the force the rear surfaces 111 of the first tabs 118 exert on the side surfaces 163 of the bridge 106 acquires both an x-force component 185 and a y-force component 187. The x-force component 185 has a magnitude and acts normal to the rear surface 111 of the first frame portion 102. The y-force component 187 has a magnitude and acts along the rear surface 111 of the first frame portion 102. The magnitude of the x-force component 185 increases as the front and rear surfaces 111 of the first frame portion 102 rotate toward the threshold angle. At the threshold angle, the magnitude of the x-force component 185 is such that the rear surfaces 157 of the first tabs 118 slip downward along the front corners of the side surfaces 163 of the bridge 106, snapping the first frame portion 102 to the fully unfolded position.

In the fully unfolded position, as shown in FIG. 8, the front and rear surfaces 111 of the first frame portion 102 are oriented about 180 degrees, or are substantially parallel, to the front and rear surfaces 157 of the bridge 106. Accordingly, the rear surfaces 111 of the first tabs 118 contact the front surfaces 157 of the upper and lower horizontal members 160 and 162 of the bridge 106. The first leaf spring 120 is in the stressed condition, urging the front and rear surfaces 111 of the first frame portion 102 to rotate beyond 180 degrees relative to the front and rear surfaces 157 of the bridge 106. Furthermore, the rear surfaces 111 of the two first tabs 118 engage the front surfaces 157 of the upper and lower horizontal members 160 and 162 of the bridge 106. This engagement limits rotation of the front and rear surfaces 111 of the first frame portion 102 to about 180 degrees relative to the front and rear surfaces 157 of the bridge 106. While engaged with the bridge 106, the two first tabs 118 project to the centerline 155 of the bridge 106. Additionally, in the fully unfolded position, the lower corners 129 of the opposed stops 126 are spaced from the rear surface 157 of the bridge 106.

The second frame portion 104 works in the same manner, but as noted above oppositely relative to the first frame portion 102. For example, when both frame portions 102 and 104 are in the fully folded position, the front and rear surfaces 111 and 135 of the frame portions 102 and 104 are spaced laterally and equally from the centerline 155 of the bridge relative to each other. In another example, when both frame portions 102 and 104 are in the fully folded position, the surfaces 111 of the first frame portion 102 are parallel relative to the surfaces 135 of the second frame portion 104. In yet another example, when both frame portions 102 and 104 are in the fully unfolded position, the surfaces 111 and 135 of the frame portions 102 and 104 are coplanar. Furthermore, in the fully unfolded position, the first and second tabs 118 and 142 project to the centerline 155 of the bridge 106. At the centerline 155 of the bridge 106, the first tabs 118 and the second tabs 142 are adjacent to one another.

FIG. 9 illustrates another embodiment of a bridge 106 configured for use with the eyeglass structure 100, as shown in FIGS. 1 and 2. In this embodiment, the substitute bridge 106 has no central bridge column 164, but the leaf springs 120 and 144 reach around the bridge columns 166 and 168 to operate in a similar manner. The substitute bridge 106 is used in place of the bridge 106 above as indicated by the same reference numerals.

FIG. 10 shows another embodiment of an eyeglass structure 100 similar to the eyeglass structure 100, as shown in FIGS. 1 and 2. In this embodiment, a substitute first frame portion 102 includes only one first tab 118 and a substitute second frame portion 104 includes only one second tab 142. The substitute frame portions 102 and 104 are used in place of the frame portions 102 and 104 above as indicated by the same reference numerals.

This written description sets forth the best mode of carrying out the invention, and describes the invention so as to enable a person of ordinary skill in the art to make and use the invention, by presenting examples of the elements recited in the claims. The detailed descriptions of those elements do not impose limitations that are not recited in the claims, either literally or under the doctrine of equivalents.

What is claimed is:

1. An eyeglass structure comprising:
   a bridge including:
      a first lateral bridge column, and
      a second lateral bridge column;
   a first frame portion including:
      a first leaf spring having a distal portion configured to reach around and rotate about the first lateral bridge column, and
      a first tab configured to engage the bridge to limit rotation about the first frame portion; and
   a second frame portion including:
      a second leaf spring having a distal portion configured to reach around and rotate about the second lateral bridge column, and
      a second tab configured to engage the bridge to limit rotation of the second frame portion.

2. The eyeglass structure of claim 1, wherein the bridge further comprises an upper horizontal member, a lower horizontal member, and an aperture defining the first lateral bridge column and the second lateral bridge column, wherein the first lateral bridge column and the second lateral bridge column interconnect the upper horizontal member and the lower horizontal member.

3. The eyeglass structure of claim 1, wherein the bridge further comprises an upper horizontal member, a lower horizontal member, a first aperture defining a first lateral bridge column that interconnects the upper horizontal member and the lower horizontal member, and a second aperture defining a second lateral bridge column that interconnects the upper horizontal member and the lower horizontal member.

4. The eyeglass structure of claim 1, wherein the distal portion of the first leaf spring includes two opposed stops configured to engage the upper horizontal member and the lower horizontal member to limit rotation of the first frame portion about the first lateral bridge column.

5. The eyeglass structure of claim 1, wherein the distal portion of the second leaf spring includes two opposed stops configured to engage the upper horizontal member and the lower horizontal member to limit rotation of the second frame portion about the second lateral bridge column.

6. The eyeglass structure of claim 1, wherein the first frame portion is rotatable under a bias of the first leaf spring from a fully folded position to a fully unfolded position, wherein the rear surface of the first frame portion is oriented about 90 degrees relative to the rear surface of the bridge in the fully folded position and about 180 degrees relative to the rear surface of the bridge in the fully unfolded position.

7. The eyeglass structure of claim 1, wherein the second frame portion is rotatable under a bias of the second leaf spring from a fully folded position to a fully unfolded position, wherein the rear surface of the second frame portion is oriented about 90 degrees relative to the rear surface of the bridge in the fully folded position and about 180 degrees relative to the rear surface of the bridge in the fully unfolded position.

8. The eyeglass structure of claim 1, wherein the first frame portion, including the first tab and the first leaf spring, are formed as a unitary piece, and wherein the second frame portion, including the second tab and the second leaf spring, are formed as a unitary piece.

9. An eyeglass structure comprising:
a bridge including:
an upper horizontal member,
a lower horizontal member,
a first aperture defining a first lateral bridge column that interconnects the upper horizontal member and the lower horizontal member, and
a second aperture defining a second lateral bridge column that interconnects the upper horizontal member and the lower horizontal member;
a first frame portion including:
a first leaf spring having a distal portion configured to reach around and rotate about the first lateral bridge column, and
a first tab configured to engage the bridge to limit rotation of the first frame portion; and
a second frame portion including:
a second leaf spring having a distal portion configured to reach around and rotate about the second lateral bridge column, and
a second tab configured to engage the bridge to limit rotation of the second frame portion.

10. The eyeglass structure of claim 9, wherein the distal portion of the first leaf spring includes two opposed stops configured to engage the upper horizontal member and the lower horizontal member to limit rotation of the first frame portion about the first lateral bridge column.

11. The eyeglass structure of claim 9, wherein the distal portion of the second leaf spring includes two opposed stops configured to engage the upper horizontal member and the lower horizontal member to limit rotation of the second frame portion about the second lateral bridge column.

12. The eyeglass structure of claim 9, wherein the first frame portion is rotatable under a bias of the first leaf spring from a fully folded position to a fully unfolded position,
wherein the rear surface of the first frame portion is oriented about 90 degrees relative to the rear surface of the bridge in the fully folded position and about 180 degrees relative to the bridge in the fully unfolded position.

13. The eyeglass structure of claim 9, wherein the second frame portion is rotatable under a bias of the second leaf spring from a fully folded position to a fully unfolded position, wherein the rear surface of the second frame portion is oriented about 90 degrees relative to the rear surface of the bridge in the fully folded position and about 180 degrees relative to the rear surface of the bridge in the fully unfolded position.

14. The eyeglass structure of claim 9, wherein the first frame portion, including the first tab and the first leaf spring, are formed as unitary piece, and wherein the second frame portion, including the second tab and the second leaf spring, are formed as a unitary piece.

15. An eyeglass structure comprising:
a bridge including:
an upper horizontal member,
a lower horizontal member,
an aperture defining a first lateral bridge column and a second lateral bridge column, wherein the first lateral bridge column and the second lateral bridge column interconnect the upper horizontal member and the lower horizontal member;
a first frame portion including:
first leaf spring having a distal portion configured to reach around and rotate about the first lateral bridge column, and
a first tab configured to engage the bridge to limit rotation of the first frame portion; and
a second frame portion including:
a second leaf spring having a distal portion configured to reach around and rotate about the second lateral bridge column, and
a second tab configured to engage the bridge to limit rotation of the second frame portion.

16. The eyeglass structure of claim 15, wherein the distal portion of the first leaf spring includes two opposed stops configured to engage the upper horizontal member and the lower horizontal member to limit rotation of the first frame portion about the first lateral bridge column.

17. The eyeglass structure of claim 15, wherein the distal portion of the second leaf spring includes two opposed stops configured to engage the upper horizontal member and the lower horizontal member to limit rotation of the second frame portion about the second lateral bridge column.

18. The eyeglass structure of claim 15, wherein the first frame portion is rotatable under a bias of the first leaf spring from a fully folded position to a fully unfolded position, wherein the rear surface of the first frame portion is oriented about 90 degrees relative to the rear surface of the bridge in the fully folded position and about 180 degrees relative to the rear surface of the bridge in the fully unfolded position.

19. The eyeglass structure of claim 15, wherein the second frame portion is rotatable under a bias of the second leaf spring from a fully folded position to a fully unfolded position, wherein the rear surface of the second frame portion is oriented about 90 degrees relative to the rear surface of the bridge in the fully folded position and about 180 degrees relative to the rear surface of the bridge in the fully unfolded position.

20. The eyeglass structure of claim 15, wherein the first frame portion, including the first tab and the first leaf spring, are formed as unitary piece, and wherein the second frame portion, including the second tab and the second leaf spring, are formed as a unitary piece.

* * * * *